United States Patent [19]
Willie et al.

[11] Patent Number: 6,094,672
[45] Date of Patent: *Jul. 25, 2000

[54] METHOD AND SYSTEM FOR TIME SYNCHRONIZATION MANAGEMENT

[75] Inventors: David J. Willie, Murray; Kevin L. Wilkins, Provo; Jay R. Cummings, Orem, all of Utah

[73] Assignee: Novell, Inc., Provo, Utah

[*] Notice: This patent issued on a continued prosecution application filed under 37 CFR 1.53(d), and is subject to the twenty year patent term provisions of 35 U.S.C. 154(a)(2).

[21] Appl. No.: 08/858,700

[22] Filed: May 19, 1997

[51] Int. Cl.$^7$ ................................................ G06F 17/00
[52] U.S. Cl. ................................................ 709/202
[58] Field of Search .................. 395/200.32, 200.33, 395/200.5, 200.51, 200.53, 200.54, 200.59

[56] References Cited

U.S. PATENT DOCUMENTS

| | | |
|---|---|---|
| 5,291,583 | 3/1994 | Bapat . |
| 5,317,568 | 5/1994 | Bixby et al. . |
| 5,317,742 | 5/1994 | Bapat . |
| 5,331,642 | 7/1994 | Valley et al. . |
| 5,386,542 | 1/1995 | Brann et al. ........................... 395/550 |
| 5,471,617 | 11/1995 | Farrand et al. . |
| 5,473,608 | 12/1995 | Oliver . |
| 5,491,796 | 2/1996 | Wanderer et al. . |
| 5,509,123 | 4/1996 | Dobbins et al. . |
| 5,517,622 | 5/1996 | Ivanoff et al. . |
| 5,522,042 | 5/1996 | Fee et al. . |
| 5,541,911 | 7/1996 | Nilakantan et al. . |
| 5,548,796 | 8/1996 | Ketchum . |
| 5,559,958 | 9/1996 | Farrand et al. . |
| 5,561,769 | 10/1996 | Kumar et al. . |
| 5,566,160 | 10/1996 | Lo . |
| 5,572,195 | 11/1996 | Heller et al. . |
| 5,586,304 | 12/1996 | Stupek, Jr. et al. . |
| 5,588,143 | 12/1996 | Stupek, Jr. et al. . |
| 5,784,421 | 7/1998 | Dolev et al. ........................... 375/354 |

OTHER PUBLICATIONS

Mills, D. SNTPv4 for Ipv4, Ipv6 and OSI, RFC 2030, 1996.
Mills, D. Internet Time Synchronization: The Network Time Protocol, IEEE Transactions on Communications, Oct. 1991.
Case et al., A Simple Network Management Protocol (SNMP) RFC 1157, 1990.
Mills, D. Network Time Protocol (Version 1) RFC1 1059, 1988.

*Primary Examiner*—Ellis B. Ramirez
*Attorney, Agent, or Firm*—Dinsmore & Shohl LLP

[57] ABSTRACT

A method and system for managing time synchronization services. The system uses standard management protocols to interface with a time synchronization management information base, which in turn interfaces with a time synchronization services module. A uniform and standard mechanism for managing time synchronization services is provided, which includes a user interface which eliminates the need to learn console commands and eases the administration of time synchronization services.

25 Claims, 9 Drawing Sheets

METHOD AND SYSTEM FOR TIME SYNCHRONIZATION MANAGEMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

FIELD OF THE INVENTION

This invention relates to time synchronization in network servers, and more particularly relates to management of time synchronization in network servers through the use of standard network management protocols. A user interface is also provided for enabling access by an administrator to relevant time synchronization information for use in such time synchronization management.

BACKGROUND OF THE INVENTION

The majority of office computers today are network-connected to enable fast and efficient communication of information among users. Networking computers together has also enabled distributed data processing, in which a distributed program can execute simultaneously on different computers at the same time. Distributed processing programs further blur the definition between a computer and a network. Such distributed processing is highly desirable, since in practically every computer network, some computers are overburdened while other computers have processing power to spare. The ability to shift processing from heavily utilized computers to computers with spare processing cycles greatly increases throughput and response time.

Each computer on a network typically has a system clock and is capable of maintaining a separate system time from every other computer on the network. Under many conditions, it is irrelevant that different computers on the same network may have different system times. However, in some situations, it is quite important that the system clocks of certain computers, for example network servers, are synchronized. For example, such synchronization can be very important in distributed databases, which maintain integrity and consistency in the database by using time stamps to order transactions. Since updates to a distributed database can be made on different computers at the same time, without time synchronization, it would be impossible to determine in what order updates to the database were made.

One known methodology for achieving time synchronization involves establishing two categories of network computers: time source computers, which are capable of providing a synchronized time to other computers, and time client computers, which obtain their synchronized time from one or more time source computers. Typically, a network computer can be both a time source computer with respect to one or more network computers, and a time client computer with respect to other network computers. Thus, a hierarchy of computers is established in which a server obtains its time from one or more parent, or time source, computers, and which can also operate as a time source to one or more child, or time client, computers. For example, NOVELL provides a time synchronization product which defines four categories of computers: primary servers, secondary servers, clients and reference servers. Primary servers are network computers that synchronize their clocks with each other, and also provide the time to secondary servers or clients. Secondary servers are computers that obtain the time from a primary server and synchronize with the primary server, but do not provide the time to a primary server. Clients are computers that merely obtain the time from a primary or secondary server but do not synchronize with any other nodes. A reference server is a special primary server computer which appears to other computers as an ordinary primary server but does not synchronize its clock with other primary servers. A reference server provides a time reference to which all other servers and clients will eventually synchronize.

The Network Time Protocol (NTP) is another example of a time synchronization methodology which uses time source and time client computers to achieve time synchronization on a network. NTP is a well known and relatively mature mechanism for maintaining time synchronization across computers in a networked environment. Accordingly, various network operating system vendors have implemented NTP as the mechanism by which they establish time synchronization on the network.

Such time source and time client time synchronization methodologies require the ability to modify and/or view the various parameters associated with the time synchronization computers, such as those parameters which define the hierarchy of time source and time client computers. This ability is typically provided through the entry of console commands. In their most basic form, console commands require the entry of predetermined command keywords, and optionally parameters in a specified format. Such console commands are typically vendor independent and differ among each vendors' implementation of time synchronization services. Thus, managing time synchronization services across the network requires knowledge of special commands, and is typically not transferable to other network operating systems, even those which also implement similar time synchronization services. Commands implemented through a console also render it difficult for external programs to interface with the time synchronization service. For example, it may be desirable to develop a graphical user interface program which interacts with the time synchronization service to implement a more user-friendly mechanism for modifying and/or viewing the various parameters associated with the time synchronization services.

As computer networks have proliferated, management of network-attached devices has become more and more important. To ease the management of such network attached devices, management protocols, such as the Simple Network Management Protocol (SNMP), have been established which create a uniform and standard mechanism for managing devices on a network. Under SNMP, each managed device implements a Management Information Base (MIB), which is a database of managed objects associated with the managed device. Each managed object in the MIB is syntactically defined in a MIB listing. The objects in a MIB are queried and/or modified from management station software running on a computer coupled to the network. The MIB listing is used by the management station to determine what objects are implemented in a particular managed device. Through the definitions of the objects in the MIB listing, the management station can generate and communicate to the managed device SNMP GET, SET and GET NEXT requests, to view and/or modify, as appropriate, the objects in the managed device. Thus, SNMP defines a protocol by which individuals familiar with SNMP, or management software which utilizes SNMP, can manage any SNMP-enabled device, without being specially trained to manage each respective device. Another advantage of using a management protocol, such as SNMP, to manage devices, is that the use of such a standard management protocol ensures that software written to interact with the managed device will run on any network which supports the SNMP protocol.

SUMMARY OF THE INVENTION

It is one object of this invention to provide a mechanism which uses standard network management protocols for managing time synchronization among computers in a networking environment.

It is another object of this invention to provide a method and system for implementing a time synchronization Management Information Base for use in managing time synchronization services.

It is yet another object of this invention to provide a user interface which interacts with a time synchronization Management Information Base for administering time synchronization services using standard network management protocols.

It is still another object of this invention to provide a method and system for managing time synchronization services which use a time source and time client computer methodology.

Additional objects, advantages and other novel features of the invention will be set forth in the description that follows. To achieve the foregoing and other objects and in accordance with the purposes of the present invention as described above, a method and system are provided for managing time synchronization among network-attached computers. A time synchronization Management Information Base is provided which has at least one client object which is operative to maintain information about a client server. The MIB also includes a source object which is operative to maintain information about a source server. The MIB is implemented in an agent which is associated with a particular network computer to manage. A time synchronization management signal is sent to the agent, and either the source object or the client object is accessed in response to the time synchronization management signal.

According to one embodiment of this invention, the source object is a table object having a row, or sequence, of objects which are operative to maintain information about a source server. The source table object can contain a plurality of sequences, each sequence containing a plurality of objects which are operative to maintain information about a particular source server. The source table object preferably contains a sequence of objects for each network server which is a time synchronization source for the respective managed server. The objects in the sequence can include a source identifier object which is operative to identify a particular source server, and a source discrepancy object which is operative to indicate a time discrepancy between the managed server and the particular source server. The client object can be a table object having a sequence of objects which are operative to maintain information about a client computer.

The client table object can contain a plurality of sequences, each sequence containing a plurality of objects which are operative to maintain information about a particular client server. The client table object preferably contains a sequence of objects for each client computer which uses the managed server as a source of a synchronized time. The objects in the sequence can include a client identifier object operative to identify a client computer, and a client status object operative to maintain a status of the client computer.

According to another embodiment of this invention, a graphical user interface is provided which is operative to read or modify one or more objects in the MIB. The user interface can display time synchronization information on a display device in an easy to understand and intuitive graphical format. The user interface uses standard network management protocols to access the sequences of objects from the source and client tables, and thus is not tied to a particular vendor's implementation of time synchronization services, making the user interface highly portable across different platforms. The user interface enables time synchronization to be administered in a highly intuitive manner, decreasing time and training costs associated with such administration.

Still other objects of the present invention will become apparent to those skilled in this art from the following description, wherein there is shown and described preferred embodiments of this invention. As will be realized, the invention is capable of other different obvious aspects all without departing from the invention. Accordingly, the drawings and description will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

Reference will now be made in detail to preferred embodiments of the invention, examples of which are illustrated in the accompanying drawings, wherein like numerals indicate the same elements throughout the views.

DETAILED DESCRIPTION

Figure 1:
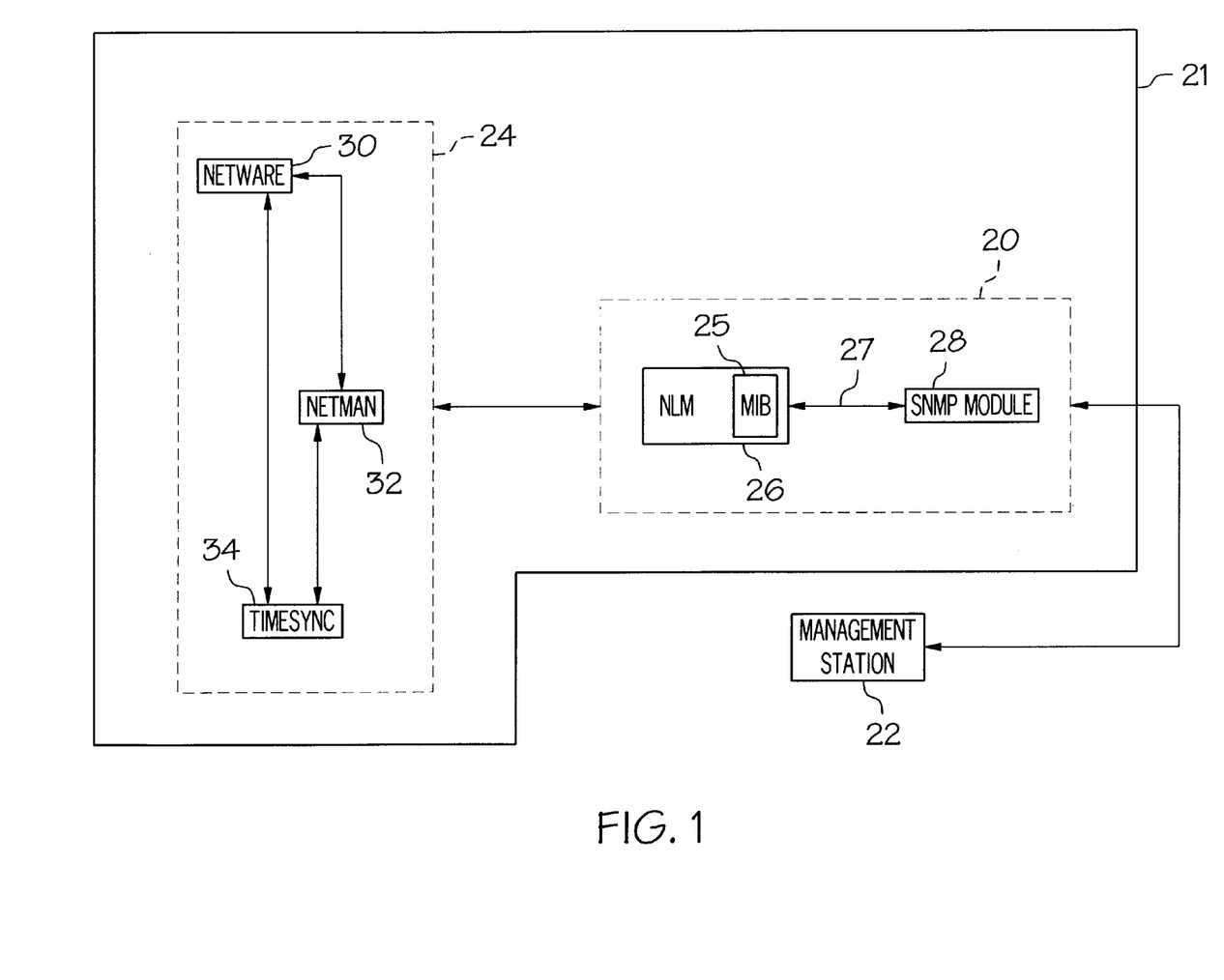
FIG. 1 is a block diagram illustrating aspects of the method and system for managing time synchronization according to one embodiment of this invention.

Referring now to the drawings, FIG. 1 is a block diagram illustrating aspects of the method and system for managing time synchronization according to one embodiment of this invention. Management station 22 can comprise conventional SNMP management station software executing on conventional network-attached computers. Such management station software is well known to those skilled in the art, and can comprise, for example, NOVELL's MANAGEWISE or HEWLETT PACKARD's OPEN VIEW products. Such management software communicates with an SNMP agent 20 using the SNMP protocol. The SNMP protocol includes GET, SET, and GET NEXT requests which are used by management station 22 to indicate to SNMP agent 20 to set or retrieve the value of one or more managed objects. SNMP agent 20 is associated with a particular managed server 21. Managed server 21 can comprise a conventional network-attached computer running a conventional operating system.

SNMP agent 20 implements a time synchronization Management Information Base (MIB) 25 which contains a plurality of managed objects. The managed objects are syntactically defined in a MIB listing, which management station 22 uses to determine what objects SNMP agent 20 supports. In some respects a MIB is a virtual rather than a physical database, in that the data associated with a managed object may exist in the agent which implements the MIB, such as SNMP agent 20, or may exist elsewhere, such as in object repository 24, for example. However, the ultimate source of the data associated with a managed object is unimportant to management station 22, which merely sends time synchronization signals, such as GET or SET requests, to agent 20, and expects in return responses from agent 20.

Development of SNMP agents, in general, is well known to those skilled in the art and will not be described in detail herein. According to one embodiment of this invention, SNMP agent 20 is implemented with the use of the NOVELL Software Developers Kit (SDK). To ease the development of SNMP agents, the NOVELL SDK implements standard SNMP-related processing in a vendor-supplied module, as illustrated by SNMP module 28. Thus, the developer of the SNMP agent need only concentrate on implementing the managed objects, and need not be burdened with developing code to handle standard SNMP-related processing. NLM 26 is the module which implements the managed objects in time synchronization MIB 25, according to one embodiment of this invention. MIB compilers typically generate ".C" and ".H" files used to implement managed objects in a SNMP agent. Such files would be used in NLM 26 to define the layout of the managed objects. Path 27 represents the interface between NLM 26 and SNMP module 28, such interface being described in detail in the NOVELL MANAGEWISE 2.1 SDK. Although agent 20 has been described with respect to a particular vendor's implementation of SNMP agents, it is apparent that SNMP agent 20 can be implemented in other ways, such as in a single integral module.

NLM 26 also includes the functionality necessary to interface with the software and/or hardware which contains the data associated with the managed objects in MIB 25. Such data may be contained within object repository 24, which includes the module which implements time synchronization services in a network server, such as time synchronization module 34. SNMP agent 20 can interface with time synchronization module 34 through the use of an Application Programming Interface (API) such as netman module 32, or other interfaces known to those skilled in the art. An API can be beneficial in providing a uniform and relatively constant interface for external modules such as SNMP agent 20 to access operating system data, such as is available from NETWARE module 30 or time synchronization module 34, and yet allow the internal mechanisms of such modules to change without affecting such external modules. Thus, SNMP agent 20 invokes netman module 32, which in turn retrieves and/or modifies variables and data maintained by time synchronization module 34. However, it is apparent that an API interface is not required, and that SNMP agent 20 could interface directly with time synchronization module 34.

The time synchronization manager according to this invention interfaces with a time synchronization service which uses time source and time client computers, for example, as embodied in time synchronization module 34. Such a time synchronization module will be disclosed herein with reference to NOVELL time synchronization services, which uses a hierarchy of reference, primary, secondary and client computers, but it is apparent that the invention has applicability to other time synchronization services which create a hierarchy of time source and time client computers to maintain time synchronization. For example, in such a time synchronization system, a particular managed server, such as managed server 21, can use one or more servers as source servers, any one of which can be used by the managed server as a time synchronization source. Thus, time synchronization module 34 maintains a list, or table, of source servers for managed server 21. Managed server 21 can also have associated therewith one or more client computers, each of which rely upon managed server 21 as the source of a synchronized time. Thus, time synchronization module 34 also maintains a list, or table, of client servers which rely upon managed server 21 as the source of a synchronized time.

Figure 2:
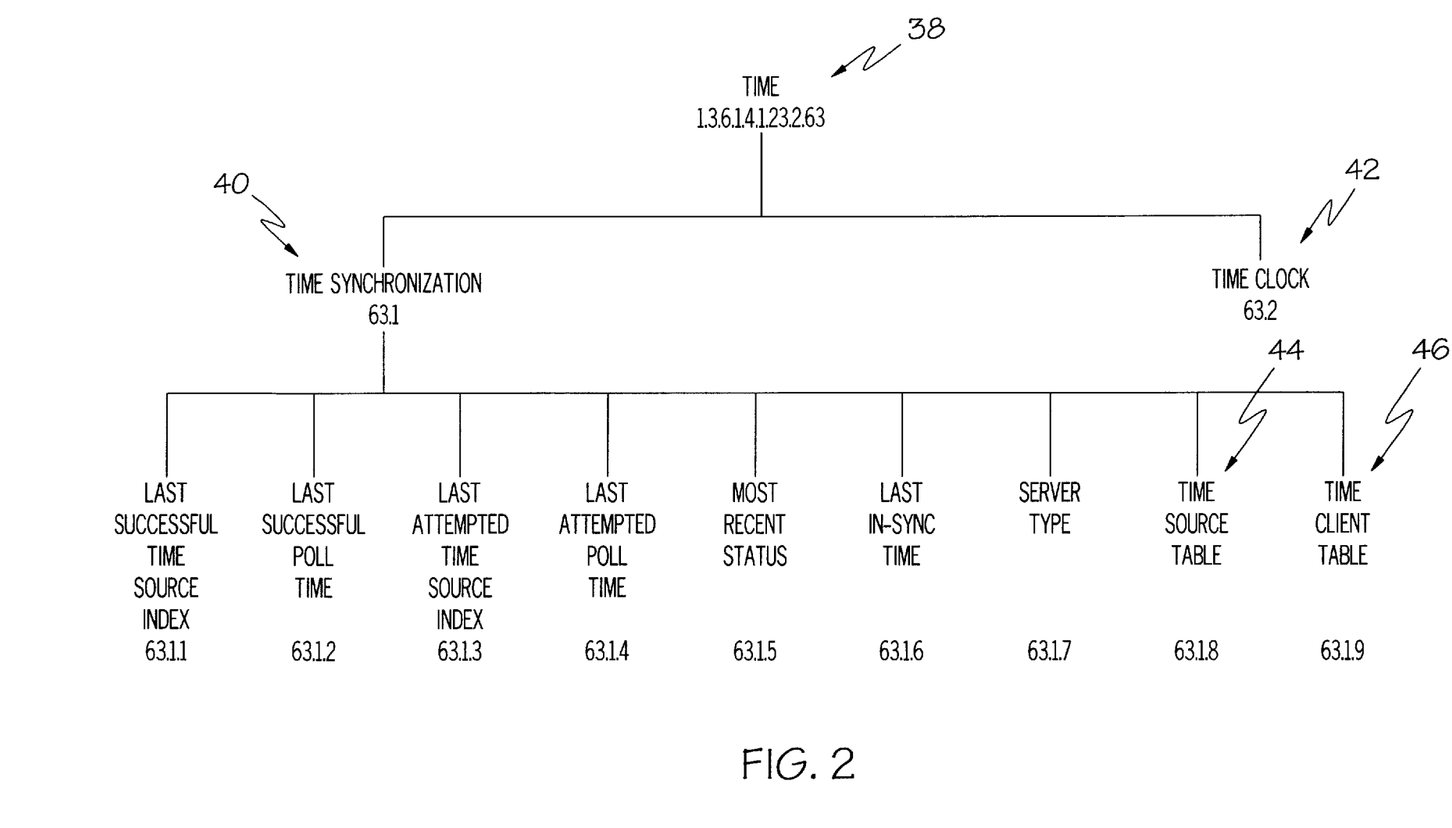
FIGS. 2–5 illustrate a hierarchy of objects in a time synchronization Management Information Base, according to one embodiment of this invention.

SNMP agent 20 implements time synchronization MIB 25, and interfaces with time synchronization module 34 to gain access to the time synchronization information maintained by time synchronization module 34 upon receipt of a request, such as a GET or SET request, from management station 22. FIG. 2 is a schematic diagram of objects implemented in time synchronization MIB 25, according to one embodiment of this invention. Objects in a MIB are identified through the use of an object identifier, which comprises a series of digits separated by periods. For example, time object 38 has an object identifier of 1.3.6.1.4.1.23.2.63. Periods are field separators, with each field referring to a parent object in a hierarchy of objects. Thus, time object 38 is child object 63 to the parent object having object identifier 1.3.6.1.4.1.23.2. As is known to those skilled in the art, the general hierarchy of objects includes ISO, ORG, DOD, INTERNET, private, and enterprise objects (1.3.6.1.4.1).

Certain objects, such as group objects, are essentially "place holder" objects used to collect a group of related child objects. Time synchronization object 40 is such a group object. Time synchronization object 40 is a parent object to a plurality of child objects which relate to time synchronization data associated with managed server 21. The references herein to locations of objects is with respect to their location within the hierarchy of objects according to one embodiment of this invention, and in general could be located at practically any other location within MIB 25 without departing from the invention. In the figures and specification, rather than using the entire object identifier of the object to describe its location in MIB 25, only the digits and periods which uniquely identify time object 38 and its child objects are used. Thus, the prefix "1.3.6.1.4.1.23.2." is assumed.

Child objects of time synchronization object 40 include objects which relate to the time synchronization state of managed server 21, including a last successful time source index object at location 63.1.1, a last successful poll time object at location 63.1.2, a last attempted time source index at location 63.1.3, a last attempted poll time object at location 63.1.4, a most recent status object at location 63.1.5, a last in-sync time object at location 63.1.6, and a server type object at 63.1.7.

Objects in a MIB are defined using a notation referred to as the International Organization for Standardization (ISO) ASN.1 syntax (ISO/IEC 8824). The ASN.1 syntax for the objects at locations 63.1.1–63.1.7 of MIB 25 according to one embodiment of this invention is as follows:

```
nwLastSuccessTimeSourceIndex OBJECT-TYPE
    SYNTAX INTEGER
    ACCESS read-only
    STATUS mandatory
    DESCRIPTION
        "An index into a server reference table which refers to the time source
        that was last polled successfully."
    ::= { nwTimeSync 1 }
nwLastSuccessfulTimeSync OBJECT-TYPE
    SYNTAX DateAndTime
    ACCESS read-only
    STATUS mandatory
    DESCRIPTION
        "The date and time (according to this server's clock)
        when this server last polled successfully."
    ::= { nwTimeSync 2 }
nwLastAttemptedTimeSourceIndex OBJECT-TYPE
    SYNTAX INTEGER
    ACCESS read-only
    STATUS mandatory
    DESCRIPTION
        "An index into the server reference table
        for the particular time source that this server
        last attempted to poll."
    ::= { nwTimeSync 3 }
nwLastAttemptedTimeSync OBJECT-TYPE
    SYNTAX DateAndTime
    ACCESS read-only
    STATUS mandatory
    DESCRIPTION
        "The date and time (according to this server's clock)
        when this server last attempted to poll."
    ::= { nwTimeSync 4 }
nwLastTimeSyncStatus OBJECT-TYPE
    SYNTAX INTEGER {
        outOfSync(0),
        insyncClock(1),
        insyncToNet(2)
    }
    ACCESS read-only
    STATUS mandatory
    DESCRIPTION
        "The most recent time synchronization status
        for this server:
        0 = Out of sync
        1 = In sync with clock
        2 = In sync to network"
    ::= { nwTimeSync 5 }
nwLastTimeInTimeSync OBJECT-TYPE
    SYNTAX DateAndTime
    ACCESS read-only
    STATUS mandatory
    DESCRIPTION
        "The most recent date and time that
        this server's time was in sync to network."
    ::= { nwTimeSync 6}
nwServerTimeType OBJECT-TYPE
    SYNTAX INTEGER {
        unknown(0),
        client(1),
        secondary(2),
        primary(3),
        reference(4),
        single(5)
    }
    ACCESS read-only
    STATUS mandatory
    DESCRIPTION
        "The type of this time server:
        0 = Unknown
        1 = Client
        2 = Secondary
        3 = Primary
        4 = Reference
        5 = Single"
    ::= { nwTimeSync 7 }
©1997 Novell Inc.
```

Figure 3:
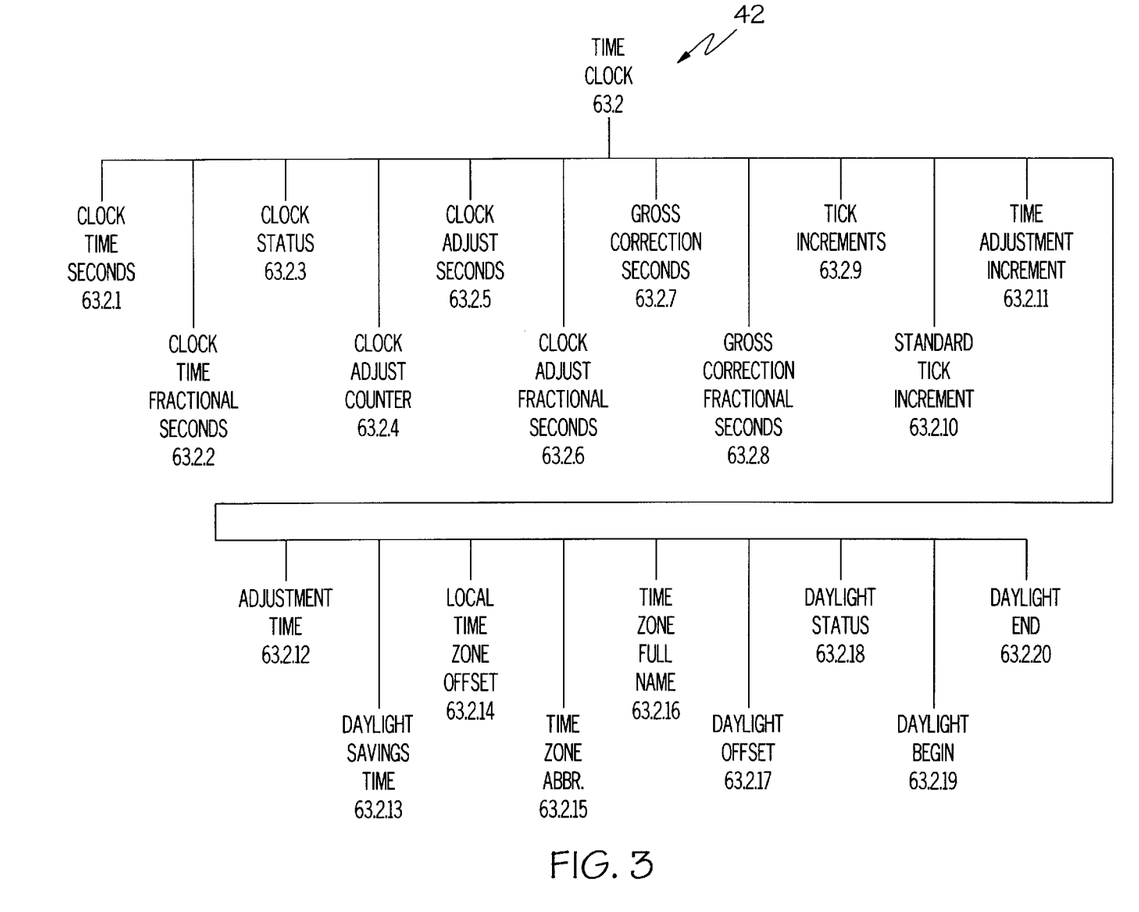

Time clock object 42, at location 63.2, is another group object in time synchronization MIB 25 according to this invention. Time clock object 42 and its child objects are illustrated in more detail in FIG. 3. Time clock object 42 is a parent object to child objects which contain data relating to the clock of managed server 21. The objects in time clock object 42 include a clock time seconds object at location 63.2.1, a clock time fractional seconds object at location 63.2.2, a clock status object at location 63.2.3, a clock adjustment counter object at location 63.2.4, a clock adjustment seconds object at location 63.2.5, a clock adjustment fractional seconds object at location 63.2.6, a gross correction seconds object at 63.2.7, a gross correction fractional seconds object at location 63.2.8, a tick increment object at location 63.2.9, a standard tick increment object at location 63.2.10, a time adjustment increment object at location 63.2.11, an adjustment time object at location 63.2.12, a daylight savings time object at location 63.2.13, a local time zone offset object at location 63.2.14, a time zone abbreviation object at location 63.2.15, a time zone full name object at location 63.2.16, a daylight offset object at location 63.2.17, a daylight status object at location 63.2.18, a daylight begin object at location 63.2.19, and a daylight end object at location 63.2.20. The ASN.1 syntax for the objects in time clock object 42, according to one embodiment of this invention, is as follows:

```
nwClkTimeSec OBJECT-TYPE
    SYNTAX WholeSeconds
    ACCESS read-only
    STATUS mandatory
    DESCRIPTION
        "UTC time (in whole seconds) that has
        elapsed since midnight 1 January 1980.
        This integer is the upper 32 bits of
        a 64-bit number with a fixed point
        between the upper and lower 32 bits."
    ::= { nwTimeClock 1 }
nwClkTimeFrac OBJECT-TYPE
    SYNTAX FractionalSeconds
    ACCESS read-only
    STATUS mandatory
    DESCRIPTION
        "UTC time (in fractional seconds) that has
        elapsed since midnight 1 January 1980.
        This integer is the lower 32 bits of a
        64-bit number with a fixed point between
        the upper and lower 32 bits."
    ::= { nwTimeClock 2 }
nwClkStatus OBJECT-TYPE
    SYNTAX INTEGER
    ACCESS read-only
    STATUS mandatory
    DESCRIPTION
        "0X00000001 - Clock is synchronized
        0X00000002 - Clock is network synchronized
        0X00000004 - Clock synchronization is active
        0X00000008 - Clock external synchronization is active
        0X0000F000 - Clock status external sync type
        0X00000F00 - Clock status server type
    ::= { nwTimeClock 3}
nwClkAdjustCount OBJECT-TYPE
    SYNTAX Counter
    ACCESS read-only
```

```
    STATUS mandatory
    DESCRIPTION
      "To synchronize a clock slowly, over time, a small
      adjustment is made to the clock several times.
      This object contains the number of times that the
      adjustment increment is added or subtracted to
      synchronize or correct the clock. The count is decremented
      each time an incremental adjustment is made."
  ::= {nwTimeClock 4 }
nwClkAdjustSec OBJECT-TYPE
    SYNTAX WholeSeconds
    ACCESS read-only
    STATUS mandatory
    DESCRIPTION
      "The time increment (in whole seconds)
      that is used in adjusting the server clock.
      This integer is the upper 32 bits of a
      64-bit number with a fixed point between
      the upper and lower 32 bits. The entire
      64-bit number is obtained by dividing
      the count (nwClkAdjustCount) into the
      discrepancy."
  ::= { nwTimeClock 5 }
nwClkAdjustFrac OBJECT-TYPE
    SYNTAX FractionalSeconds
    ACCESS read-only
    STATUS mandatory
    DESCRIPTION
      "The time increment (in fractional seconds)
      that is used in adjusting the server clock.
      This integer is the lower 32 bits of a
      64-bit number with a fixed point between
      the upper and lower 32 bits. The entire
      64-bit number is obtained by dividing
      the count (nwClkAdjustCount) into the
      discrepancy."
  ::= { nwTimeClock 6}
nwClkGrossCorrectSec OBJECT-TYPE
    SYNTAX WholeSeconds
    ACCESS read-only
    STATUS mandatory
    DESCRIPTION
      "The remainder (in whole seconds) after
      dividing the tick length (1/18 of a second)
      into the time interval that is allowed for
      synchronizing time. This integer is added or
      subtracted when the adjustment count reaches 0."
  ::= { nwTimeClock 7 }
nwClkGrossCorrectFrac OBJECT-TYPE
    SYNTAX FractionalSeconds
    ACCESS read-only
    STATUS mandatory
    DESCRIPTION
      "The remainder (in fractional seconds) after
      dividing the tick length (1/18 of a second)
      into the time interval that is allowed for
      synchronizing time. This integer is added or
      subtracted when the adjustment count reaches 0."
  ::= { nwTimeClock 8 }
nwClkTickIncrement OBJECT-TYPE
    SYNTAX WholeSeconds
    ACCESS read-only
    STATUS mandatory
    DESCRIPTION
      "Default tick length = 1/18 of a second,
      but can change as necessary."
  ::= { nwTimeClock 9 }
nwClkStdTickIncrement OBJECT-TYPE
    SYNTAX INTEGER
    ACCESS read-only
    STATUS mandatory
    DESCRIPTION
      "Standard tick length = 1/18 of a second."
  ::= { nwTimeClock 10 }
nwClkEventOffset OBJECT-TYPE
    SYNTAX WholeSeconds
    ACCESS read-only
    STATUS mandatory
    DESCRIPTION
      "The time increment (in whole seconds)
      between time adjustments to the clock."
  ::= { nwTimeClock 11 }
nwClkEventTime OBJECT-TYPE
    SYNTAX DateAndTime
    ACCESS read-only
    STATUS mandatory
    DESCRIPTION
      "The date and time when a time adjustment (such as for daylight
      savings time) to the clock is scheduled to occur."
  ::= { nwTimeClock 12 }
nwClkDayLight OBJECT-TYPE
    SYNTAX INTEGER {
      dstDisabled(0),
      dstEnabled(1)
    }
    ACCESS read-only
    STATUS mandatory
    DESCRIPTION
      "An integer that indicates whether this locality observes
      daylight savings time:
      1 = Yes
      0 = No"
  ::= { nwTimeClock 13 }
nwClkTimeZoneOffset OBJECT-TYPE
    SYNTAX INTEGER
    ACCESS read-only
    STATUS mandatory
    DESCRIPTION
      "The local time zone's deviation
      (in seconds) from UTC."
  ::= { nwTimeClock 14 }
nwTzName OBJECT-TYPE
    SYNTAX DisplayString
    ACCESS read-only
    STATUS mandatory
    DESCRIPTION
      "An abbreviated name or acronym of the time zone.
      Examples: MST (for Mountain Standard Time)
        EDT (for Eastern Daylight Time)"
  ::= { nwTimeClock 15 }
nwTimeZoneString OBJECT-TYPE
    SYNTAX DisplayString
    ACCESS read-only
    STATUS mandatory
    DESCRIPTION
      "The full name of the time zone.
      Examples: Mountain Standard Time
        Eastern Daylight Time"
  ::= { nwTimeClock 16 }
nwDayLightOffset OBJECT-TYPE
    SYNTAX INTEGER
    ACCESS read-only
    STATUS mandatory
    DESCRIPTION
      "The increment that is used as an offset
      for daylight savings time."
  ::= { nwTimeClock 17 }
nwClkDayLightOnOff OBJECT-TYPE
    SYNTAX INTEGER {
      notInDst(0),
      inDst(1)
    }
    ACCESS read-only
    STATUS mandatory
    DESCRIPTION
      "The current status of daylight savings time:
      0 = OFF (not in daylight savings time)
      1 = ON"
  ::= { nwTimeClock 18 }
nwClkDayLightStart OBJECT-TYPE
    SYNTAX DateAndTime
    ACCESS read-only
    STATUS mandatory
    DESCRIPTION
      "The date and time when daylight savings time begins
      (determined from the specified month and day of the week)."
  ::= { nwTimeClock 19 }
nwClkDayLightStop OBJECT-TYPE
    SYNTAX DateAndTime
```

```
    ACCESS read-only
    STATUS mandatory
    DESCRIPTION
        "The date and time when daylight savings time ends
        (determined from the specified month and day of the week)."
::= { nwTimeClock 20 }
©1997 Novell Inc.
```

Figure 4:
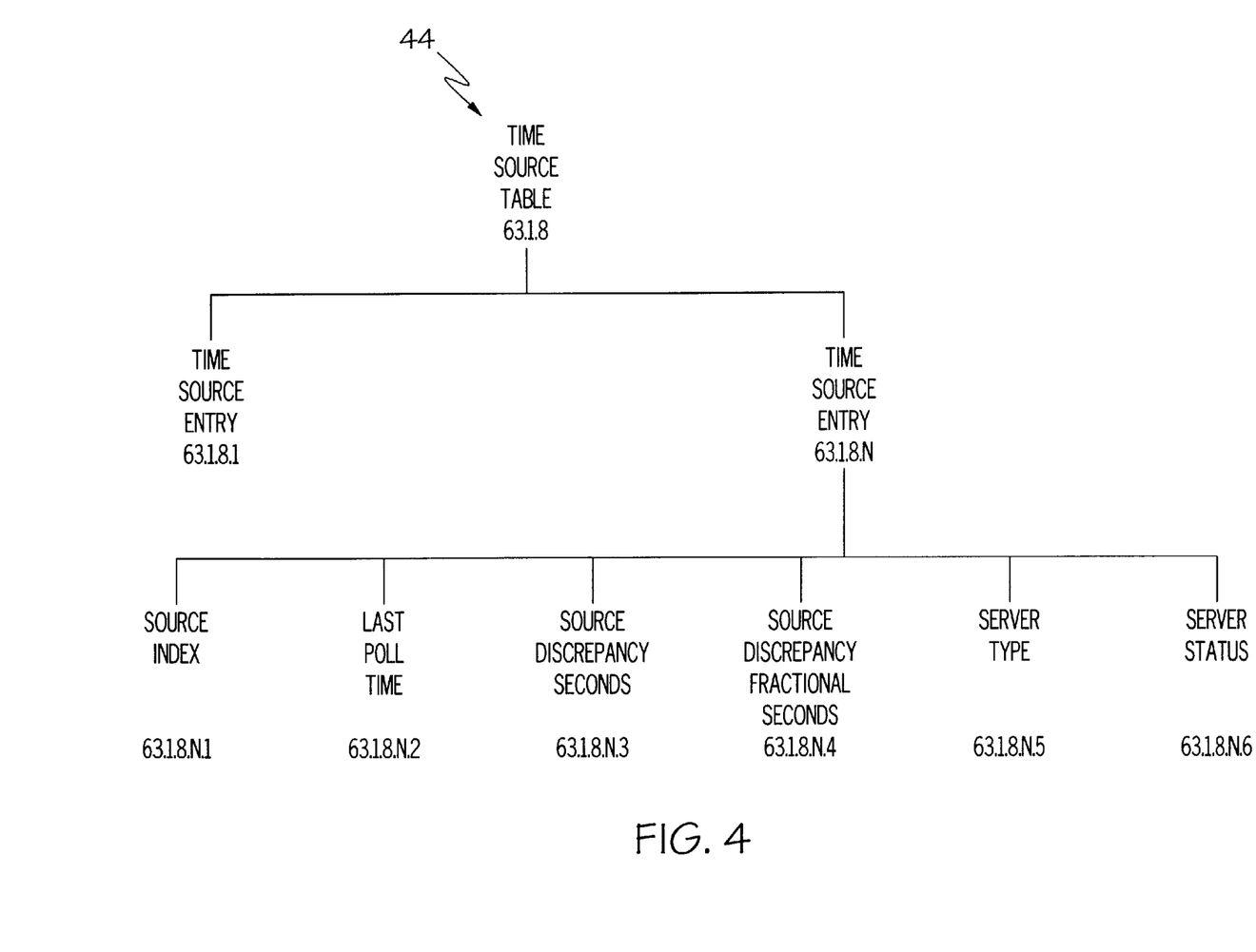

Referring again to FIG. 2, time synchronization object 40 also preferably contains a time source table object 44, at location 63.1.8, and a time client table object 46, at location 63.1.9. The time source table object 44 is a table which contains rows, or sequences, of objects which contain information about a respective time source server from which managed server 21 can obtain a synchronized time. Time source table object 44 is illustrated in greater detail in FIG. 4. Time source table object 44 contains a row, or sequence, for each server from which managed server 21 can obtain a synchronized time. The objects which are used to maintain information about a particular time source server include a source index object at location 63.1.8N.1, the 'N' in the object identifier reflecting that there can be multiple instances of the object, a last poll time object at location 63.1.8.N.2, a source discrepancy in seconds object at location 63.1.8.N.3, a source discrepancy in fractional seconds object at location 63.1.8.N.4, a server type object at location 63.1.8.N.5, and a server status object at location 63.1.8.N.6. The formal ASN.1 syntax, according to one embodiment of this invention, for time source table object 44 is as follows:

```
        nwTimeSourceTable OBJECT-TYPE
            SYNTAX SEQUENCE OF NwDSTimeEntry
            ACCESS not-accessible
            STATUS mandatory
            DESCRIPTION
                "A list of time sources for this server.
                Although this table is typically manually configured,
                you can choose to have SAP discover new
                time sources and add them to this list."
        ::= { nwTimeSync 8 }
        nwTimeSrcEntry OBJECT-TYPE
            SYNTAX NwDSTimeEntry
            ACCESS not-accessible
            STATUS mandatory
            DESCRIPTION
                "A description of a particular time source
                in the time source table."
            INDEX { nwTimeServerID}
        ::= { nwTimeSourceTable 1 }
        NwDSTimeEntry ::= SEQUENCE {
            nwTimeServerID         INTEGER,
            nwSrcTblServerTime     DateAndTime,
            nwSrcDiscrepInSec      INTEGER,
            nwSrcDiscrepInFrac     INTEGER,
            nwRemoteServerType     INTEGER,
            nwRemoteServerStatus   INTEGER
        }
        nwTimeServerID OBJECT-TYPE
            SYNTAX INTEGER
            ACCESS read-only
            STATUS mandatory
            DESCRIPTION
                "An integer that uniquely identifies a particular
                time source. The server's name or other entry information
                can be obtained by querying the reference server table."
        ::= { nwTimeSrcEntry 1 }
        nwSrcTblServerTime OBJECT-TYPE
            SYNTAX DateAndTime
            ACCESS read-only
            STATUS mandatory
            DESCRIPTION
                "The most recent date and time that
                this time sourcewas polled."
        ::= { nwTimeSrcEntry 2 }
        nwSrcDiscrepInSec OBJECT-TYPE
            SYNTAX WholeSeconds
            ACCESS read-only
            STATUS mandatory
            DESCRIPTION
                "The discrepancy (in whole seconds) between
                this server's time and that of the time source.
                This integer is the upper 32 bits of a
                64-bit number with a fixed point between
                the upper and lower 32 bits."
        ::= { nwTimeSrcEntry 3 }
        nwSrcDiscrepInFrac OBJECT-TYPE
            SYNTAX FractionalSeconds
            ACCESS read-only
            STATUS mandatory
            DESCRIPTION
                "The discrepancy (in fractional seconds) between
                this server's time and that of the time source.
                This integer is the lower 32 bits of a
                64-bit number with a fixed point between
                the upper and lower 32 bits."
        ::= { nwTimeSrcEntry 4 }
        nwRemoteServerType OBJECT-TYPE
            SYNTAX INTEGER {
                unknown(0),
                client(1),
                secondary(2),
                primary(3),
                reference(4),
                single(5)
            }
            ACCESS read-only
            STATUS mandatory
            DESCRIPTION
                "An integer that indicates the time type
                of a particular time source:
                0 = Unknown
                1 = Client
                2 = Secondary
                3 = Primary
                4 = Reference
                5 = Single"
        ::= { nwTimeSrcEntry 5 }
        nwRemoteServerStatus OBJECT-TYPE
            SYNTAX INTEGER {
                outOfSync(0),
                insyncClock(1),
                insyncToNet(2)
            }
            ACCESS read-only
            STATUS mandatory
            DESCRIPTION
                "The most recent time synchronization status
                reported by a particular time source:
                0 = Out of sync
                1 = In sync with clock
                2 = In sync to network"
        ::= { nwTimeSrcEntry 6 }
©1997 Novell Inc.
```

Figure 5:
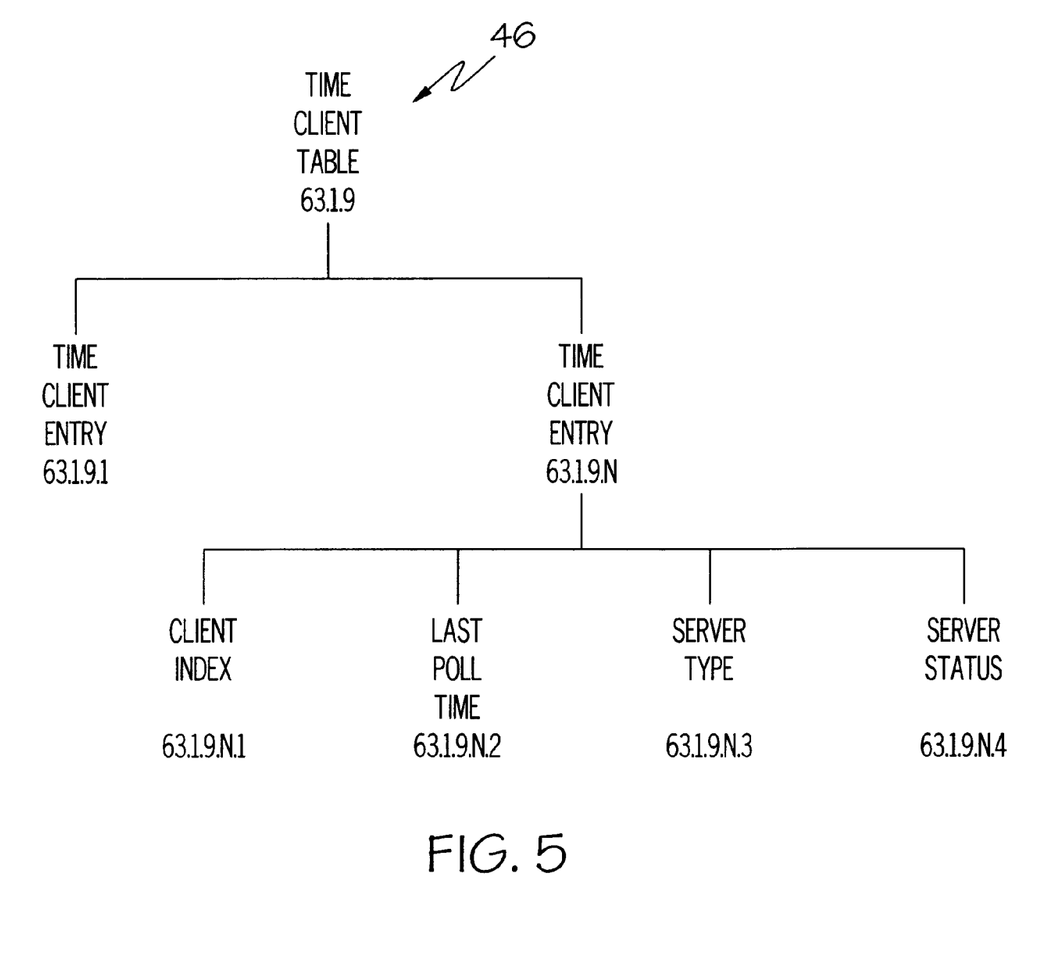

Referring now to FIG. 5, time client table object 46 is shown and described in more detail. Time client table object 46 contains rows, or sequences, of objects which maintain information about a particular client server which uses managed server 21 as the source of its synchronized time. Each row in time client table object 46 includes a client index object at location 63.1.9.N.1, a last poll time object at location 63.1.9.N.2, a server type object at location 63.1.9.N.3, and a server status object at location 63.1.9.N.4. The formal ASN. 1 syntax of time client table object 46 according to one embodiment of this invention, is as follows:

```
nwTimeClientTable OBJECT-TYPE
    SYNTAX SEQUENCE OF NwDSTimeEntry
    ACCESS not-accessible
    STATUS mandatory
    DESCRIPTION
        "A list of client servers that poll
        this server as their time source."
    ::= { nwTimeSync 9 }
nwTimeClientEntry OBJECT-TYPE
    SYNTAX NwDSTimeClientEntry
    ACCESS not-accessible
    STATUS mandatory
    DESCRIPTION
        "The description of a particular client server
        that polls this server as its time source."
    INDEX { nwTimeClientServerID}
    ::= { nwTimeClientTable 1 }
NwDSTimeClientEntry ::= SEQUENCE {
    nwTimeClientServerID    INTEGER,
    nwCltTblServerTime      DateAndTime,
    nwClientServerType      INTEGER,
    nwClientServerStatus    INTEGER
}
nwTimeClientServerID OBJECT-TYPE
    SYNTAX INTEGER
    ACCESS read-only
    STATUS mandatory
    DESCRIPTION
        "An integer that uniquely identifies a particular server
        that polls this server as a time source. This integer
        also maps as an index both to the server reference table
        and to this server's time client table. The server's name
        or other entry information can be obtained by querying
        the server reference table."
    ::= { nwTimeClientEntry 1 }
nwCltTblServerTime OBJECT-TYPE
    SYNTAX DateAndTime
    ACCESS read-only
    STATUS mandatory
    DESCRIPTION
        "The most recent date and time that this server
        was polled by a particular client server."
    ::= { nwTimeClientEntry 2 }
nwClientServerType OBJECT-TYPE
    SYNTAX INTEGER {
        unknown(0),
        client(1),
        secondary(2),
        primary(3),
        reference(4),
        single(5)
    }
    ACCESS read-only
    STATUS mandatory
    DESCRIPTION
        "The time type of a particular client server
        in this server's time client table.
        0 = Unknown
        1 = Client
        2 = Secondary
        3 = Primary
        4 = Reference
        5 = Single"
    := { nwTimeClientEntry 3 }
nwClientServerStatus OBJECT-TYPE
    SYNTAX INTEGER {
        outOfSync(0),
        insyncClock(1),
        insyncToNet(2)
    }
    ACCESS read-only
    STATUS mandatory
```

-continued

```
    DESCRIPTION
        "The most recent time synchronization status
        reported by a particular client server.
        0 = Out of sync
        1 = In sync with clock
        2 = In sync to network"
    ::= { nwTimeClientEntry 4 }
    ©1997 Novell Inc.
```

The method and system for managing time synchronization according to this invention provides a standard and uniform mechanism for managing time synchronization services, regardless of the particular network operating system platform on which it is implemented. No knowledge of vendor specific console commands or other vendor-specific interface is required. Using standard management station software, an administrator with rudimentary knowledge of SNMP can query and/or modify the time synchronization data. Implementing time synchronization management with the use of MIB 25 also allows the development of user interface modules which can be "plugged-in" to management station software to provide specialized functionality with respect to time synchronization services. Such "plug-in" modules are typically developed to have a "look and feel" which is consistent with the management station software user interface, reducing user training. Moreover, since time synchronization according to this invention is managed over a conventional network management protocol, such as via SNMP, development of such user interfaces is simplified, as the developer need only use standard GET, SET and GET NEXT commands, instead of a proprietary and vendor-specific interface.

Figure 6:
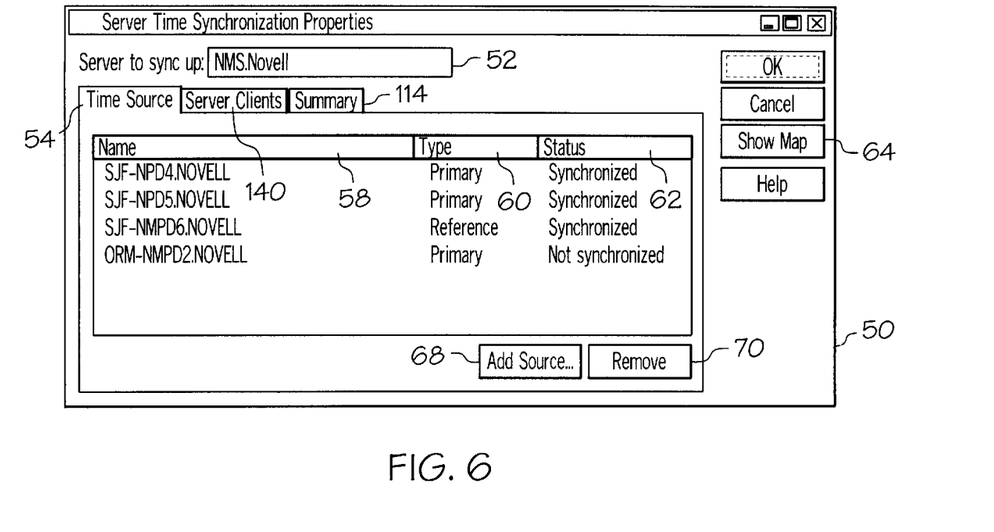
FIG. 6 is a user interface window showing attributes of time source servers, according to one embodiment of this invention.

According to one embodiment of this invention, a user interface which interfaces with SNMP agent 20 to manage time synchronization services is provided. Referring to FIG. 6, a window 50 of such an interface is illustrated in which an administrator, or other user, can enter the name of a server to be managed in an input box 52. Upon entry of the 'enter' key, tabs 54, 140 or 114, can be selected. According to another aspect of this invention, window 50 is preceded by a window which displays a list of server names. Upon user selection of one of the server names, window 50 is presented with the server name appearing in input box 52, and the relevant information for the server displayed in columns 58, 60 and 62.

Selection of tab 54 results in the display of information regarding the time source servers which can provide a synchronized time to the managed server specified in input box 52. Column 58 contains the name of each such time source server, column 60 contains the type of each such server, and column 62 contains the status of each such server with respect to the network time. The information listed in column 58, column 60 and column 62 can be obtained from time source table object 44 in MIB 25.

Figure 7:
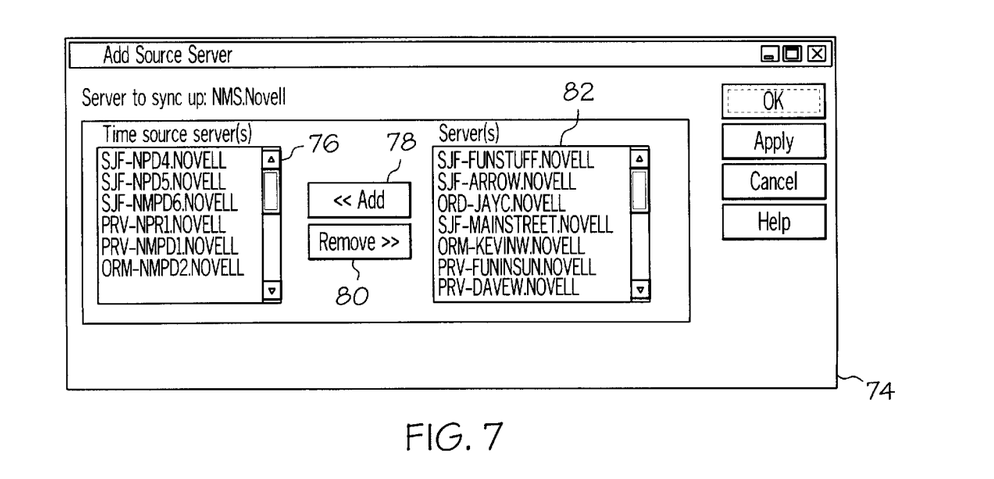
FIG. 7 is a user interface window which enables the addition of a time source server to a managed server, according to another embodiment of this invention.

Window 50 can include a button 70 to allow an administrator to remove one or more time source servers from the list of time source servers for the managed server. Window 50 also preferably includes a button 68 for adding a new time source server to the list of time source servers from which the managed server can obtain a synchronized time. Upon activating button 68, a new window, such as window 74 of FIG. 7 can be displayed. Window 74 displays a list box 76 in which the current time source servers for the managed server are displayed. List box 82 contains a list of other possible time source servers from which the managed server could obtain a synchronized time. To add one or more of the time source servers from list box 82 to the list of time source servers from which the managed server can obtain a synchronized time, the name(s) of the server in list box 82 is highlighted and button 78 is selected. To remove a time source server from the list of time source servers from which the managed server can obtain a synchronized time, the name of the server in list box 76 is highlighted and button 80 is selected. The names of the current time source servers for the managed server displayed in list box 76 can be obtained from time source table object 44. The list of network servers in box 82 can be obtained by calling the appropriate network operating system function(s) which return the names of all known network servers. Such functions are available in conventional network operating systems and are known to, or can be easily determined by those skilled in the art.

Figure 8:
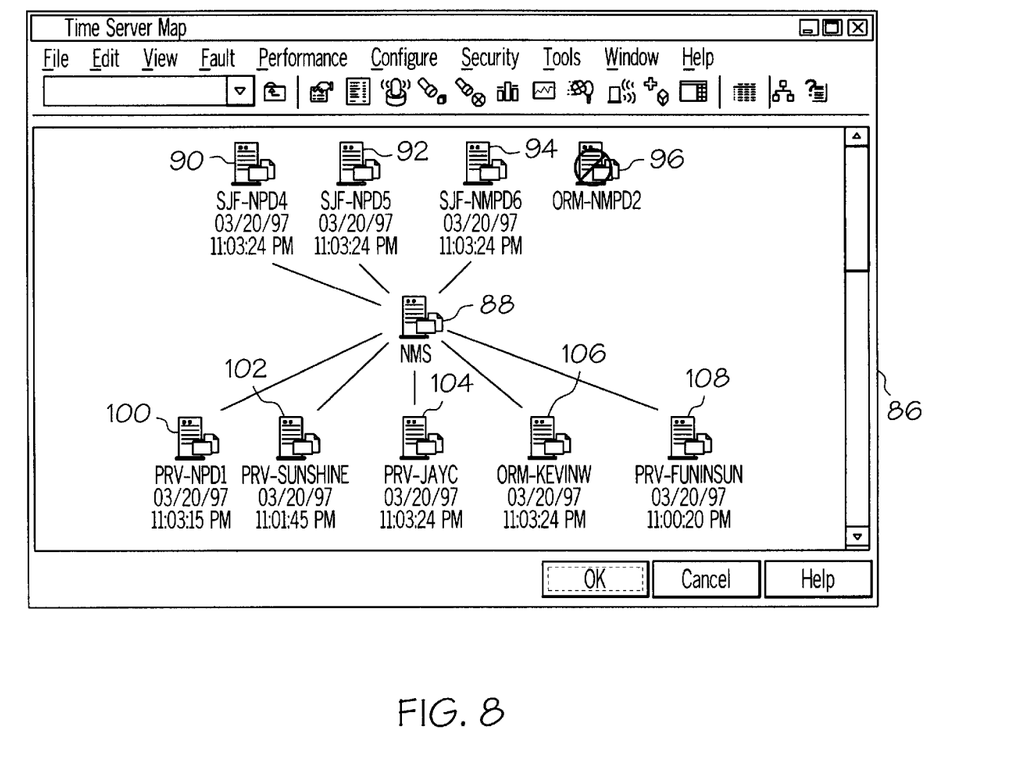
FIG. 8 is a user interface window showing a graphical view of time source servers and client source servers associated with a particular managed server.

Another feature of the method and system for time synchronization management according to one embodiment of this invention is the ability to illustrate, graphically, the relationship of a managed server's time source servers and time client servers. For example, referring again to FIG. 6, if an administrator would like to view the time source servers and time client servers of a particular managed server, button 64 can be selected. Upon selection of button 64, management station 22 (FIG. 1) communicates with SNMP agent 20 to retrieve from MIB 25 the names and other relevant information of the time source servers and time client servers for the managed server, and generates a time server map, as shown in FIG. 8. The time server map includes a graphical display showing managed server 88, and each time source server from which server 88 can obtain a synchronized time, such as servers 90, 92, 94, and 96. Server 96 is represented with a circle and a slash, representing that server 96 is currently not responding. The time server map also illustrates the client servers, or computers, of managed server 88, specifically servers 100, 102, 104, 106, and 108. Each client server uses server 88 as the source of a synchronized time. To determine the time source servers of managed server 88, management station 22 accesses time source table object 44, and to determine the time client servers of managed server 88, management station 22 accesses time client table object 46.

Figure 9:
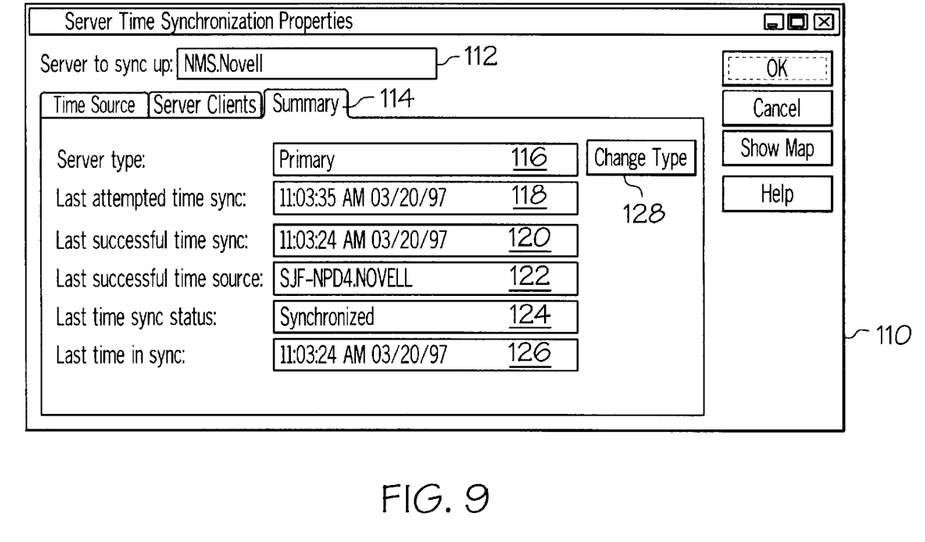
FIG. 9 is a user interface window showing summary data associated with a managed server, according to one embodiment of this invention.

FIG. 9 illustrates a window 110 containing summary information of a particular managed server. Such summary information can include the information presented in the server type field 116, which can be obtained by management station 22 from the server type object at location 63.1.7, and the last attempted time synchronization field 118, which can be obtained from the last attempted poll time object at location 63.1.4. Additional information, such as that displayed in the last successful time synchronization field 120 can be obtained from the last successful poll time object at location 63.1.2, the last successful time source field 122 can be obtained from the last successful time source index object at location 63.1.1, the last time synchronization status field at 124 can be obtained from the most recent status object at 63.1.5, and the last completed time synchronization field 126 can be obtained from the last in-sync time object at location 63.1.6. It is apparent that summary information could include more information, obtained from the various objects in time synchronization MIB 25, or less information than that shown in window 110. Button 128 can be selected to change the server type of the managed server.

Figure 10:
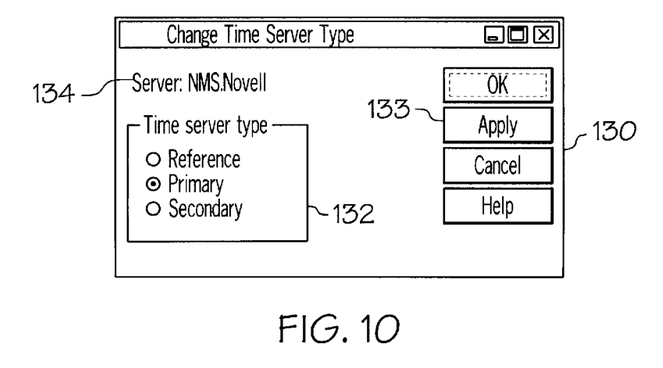
FIG. 10 is a user interface window which enables an administrator to change the time server type of a managed server.

FIG. 10 illustrates a window 130 which can be displayed after selection of button 128. Field 134 contains the name of the managed server. Group 132 contains radio buttons which allow a particular time server type to be selected. Upon selection of a particular time server type and activation of button 133, the managed server will be changed to the selected time server type.

Figure 11:
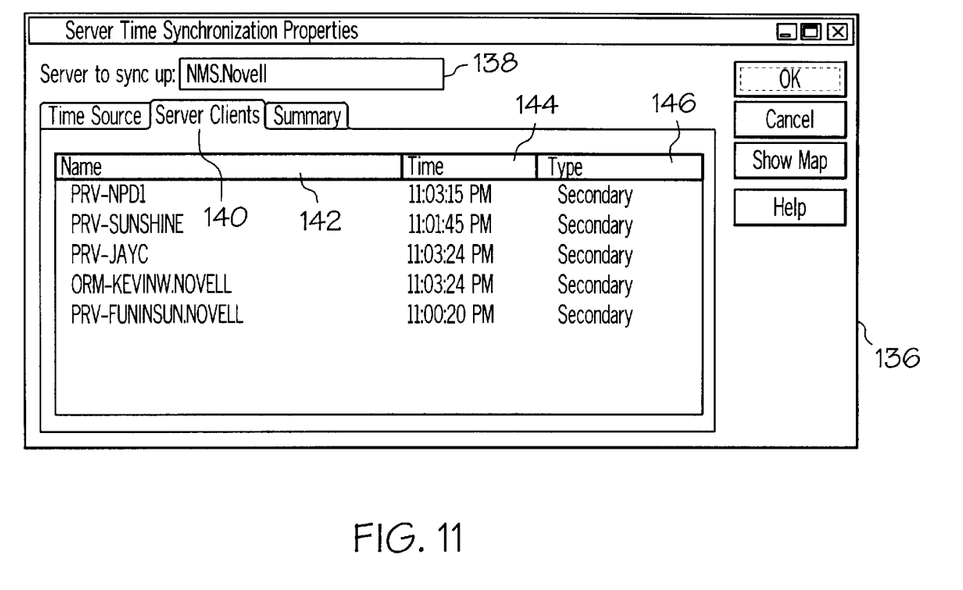
FIG. 11 is a user interface window showing the client servers of a particular managed server.

FIG. 11 illustrates a window 136 in which tab 140 has been selected. Tab 140 shows the names of all time client servers which use the managed server as a source of synchronized time. Column 142 contains the names of the time client servers, column 144 indicates the last time the managed server was polled by each time client server, and column 146 shows the type of each time client server. The information displayed in columns 142, 144, and 146 can be obtained by management station 22 from time client table object 46. It is apparent that many other functions could be provided by the user interface according to this invention via the data contained in MIB 25. The examples shown are merely representative of such functionality.

The foregoing description of preferred embodiments of the invention has been presented for purposes of illustration and description. It is not intended to be exhaustive or to limit the invention to the precise form disclosed. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method for managing time synchronization in a managed server, comprising:

defining in a MIB at least one client object being operative to maintain information about a client server;

defining in the MIB at least one source object being operative to maintain information about a source server;

implementing the MIB in an agent;

associating the agent with a server to be managed;

sending a time synchronization management signal to the agent; and accessing one of the source object and the client object in response to the time synchronization management signal.

2. A method according to claim 1, further comprising interfacing the agent with a time synchronization module.

3. A method according to claim 1, wherein the at least one source object comprises a table object, and the table object includes a sequence containing a plurality of objects operative to maintain information about the source server.

4. A method according to claim 3, wherein the table object is operative to contain a sequence for each of a plurality of source servers.

5. A method according to claim 4, wherein the plurality of objects comprises a source identifier object being operative to identify a source server and a source discrepancy object being operative to indicate a time discrepancy between the managed server and the source server.

6. A method according to claim 4, wherein the accessing step comprises reading the values of the plurality of objects from a sequence associated with one of the plurality of source servers, and further comprising displaying the values of the plurality of objects on a display device.

7. A method according to claim 1, wherein the time synchronization management signal comprises a read request to obtain the value of the at least one source object.

8. A method according to claim 1, wherein the time synchronization management signal comprises a write request to set the value of the at least one source object.

9. A method according to claim 8, wherein the write request is an SNMP set request.

10. A method according to claim 1, wherein the at least one source object comprises a plurality of objects, including a source identifier object being operative to identify a source server and a source discrepancy object being operative to indicate a time discrepancy between the network server and the source server identified by the source identifier object, and the at least one client object comprises a plurality of client objects, including a client identifier object being operative to identify a client server, and a client status object being operative to maintain a status of the client server identified by the client identifier object.

11. A method according to claim 1, further comprising defining in the MIB at least one managed server object being operative to maintain a clock adjustment offset for synchronizing the managed server with the source server.

12. A method according to claim 1, wherein the information comprises a time type of the respective server.

13. A method according to claim 1, wherein the information comprises the most recent time that polling occurred with respect to the respective server.

14. A system for managing time synchronization in a server, comprising:
    an agent associated with a network server to be managed, the agent being operative to respond to a synchronization management signal;
    a MIB implemented by the agent, the MIB containing at least one client object being operative to maintain information about a client server, and at least one source object being operative to maintain information about a source server; and
    a user interface including a process operative to send, upon request, a synchronization management signal to the agent.

15. A system according to claim 14, wherein the at least one source object comprises a table object, and the table object includes a sequence containing a plurality of objects operative to maintain information about the source server, and the table is operative to contain a sequence for each of a plurality of source servers.

16. A system according to claim 13, wherein the plurality of objects comprises a source identifier object being operative to identify a source server and a source discrepancy object being operative to indicate a time discrepancy between the network server and the source server identified by the source identifier object.

17. A system according to claim 16, wherein the user interface is operative to request from the agent the values of the objects in each sequence of the table object, and is operative to display at least some of the values from each sequence on an output device.

18. A system according to claim 14, wherein the synchronization management signal is an add request to add a new source server from which the network server can synchronize, and in response to the add request, the agent is operative to add a new sequence regarding the new source server to the table object.

19. A method for managing time synchronization in a network server, comprising:
    designating a client server;
    designating a source server;
    defining in a MIB a first client object being operative to identify the client server, and a second client object being operative to maintain a status of the client server identified by the first client object;
    defining in the MIB a first source object being operative to identify a source server, and a second source object being operative to indicate a time discrepancy between the network server and the source server identified by the first source object;
    defining in the MIB a first network object being operative to maintain a clock adjustment offset for synchronizing the network server with the source server, and a second network object being operative to maintain a time to provide to the client server;
    implementing the MIB in an agent; and
    associating the agent with the network server.

20. A method according to claim 19, further comprising designating a plurality of source servers, and wherein the first source object and the second source object are maintained in a sequence of a source table object, and the source table object is operative to maintain a sequence of the first source object and the second source object for each of the plurality of source servers.

21. A method according to claim 20, further comprising sending, from a user interface module, a write request to the agent to add a new first source object and a new second source object to the source table object, and adding a new sequence to the source table object in response to the write request.

22. A method according to claim 19, further comprising sending a request to the agent to return a value of the first source object, and displaying the returned value on a display device.

23. A method according to claim 1, wherein the at least one client object comprises a client table object, and the client table object includes a sequence containing a plurality of objects operative to maintain information about the client server.

24. A method according to claim 23, wherein the client table object is operative to contain a sequence for each of a plurality of client servers.

25. A method according to claim 24, wherein the plurality of objects contained in each client server sequence comprises a client identifier object being operative to identify the respective client server and a client status object being operative to maintain a status of the client server identified by the client identifier object.

* * * * *